United States Patent [19]

Ono et al.

[11] 3,783,344
[45] Jan. 1, 1974

[54] LIFTING MAGNET ASSEMBLY
[75] Inventors: Kuniharu Ono; Tsutomu Kamae; Kinzo Takahashi; Masao Miyatake, all of Niihama, Japan
[73] Assignee: Sumitimi Jukikai Kogyo Kabushiki Kaisha, Tokyo, Japan
[22] Filed: Jan. 5, 1972
[21] Appl. No.: 215,588

[52] U.S. Cl. .............................. 317/123, 335/295
[51] Int. Cl. .............................................. H01f 7/04
[58] Field of Search ................... 335/291, 294, 295, 335/286, 287; 317/123

[56] References Cited
UNITED STATES PATENTS

| 3,363,209 | 1/1968 | Pevar | 335/286 |
| 2,348,967 | 5/1944 | Duby | 335/295 |
| 1,316,672 | 9/1919 | Bethke | 335/291 |

FOREIGN PATENTS OR APPLICATIONS

| 1,113,105 | 7/1958 | Germany | 335/287 |

Primary Examiner—J. D. Miller
Assistant Examiner—Harry E. Moose, Jr.
Attorney—John J. McGlew et al.

[57] ABSTRACT

The assembly includes at least one core of permanent magnet metal, a respective magnetizing winding embracing each core and a casing having walls at least partially enclosing each winding. An energizing circuit connected to each winding includes switch means selectively operable to energize the windings in a forward direction, to augment the permanent magnet flux of the cores, or in a reverse direction, to neutralize the permanent magnet flux of the cores. A timer in the energizer circuit is operable, following the lapse of a predetermind short interval after energization of the windings in the forward direction, to pick up a load by magnetic attraction, to deenergize the windings so that the load is held magnetically by the permanent magnet flux of the cores. The energizing circuit further provides a small holding current to the windings in the forward direction. Each core has a pole piece of magnetizable metal on its outer end and, in one embodiment of the invention, the pole pieces are pivotally secured to the associated cores so as to be swingable to embrace a load having a circular cross section such as, for example, an iron pipe.

3 Claims, 10 Drawing Figures $Br \fallingdotseq 1.3 \, wb/m^2$
$Hc \fallingdotseq 52,000 \, AT/m$ $Br \fallingdotseq 1.1 \, wb/m^2$
$Hc \fallingdotseq 150 \, AT/m$

LIFTING MAGNET ASSEMBLY

FIELD AND BACKGROUND OF THE INVENTION

This invention relates to a lifting magnet assembly for hoisting magnetizable weighty masses or bodies.

The conventional electromagnetic unit, in the lifting magnetic assembly serving for the above purpose comprises generally a soft iron core and a winding wound thereon. When current is applied to the winding or coil, an electromagnetic lifting force is generated in the core. When the current is interrupted, however, the electromagnetic force will disappear instantly.

In the case of an accidental failure of current feed to the coil, as caused by troubles at the power station or by a breakage of the current transmission system, while a magnetizable mass is being hoisted and transferred by the electromagnet, the mass will lose its attracting force and the load will drop suddenly by gravity, giving rise to a grave accident including damage or even loss of human lives.

SUMMARY OF THE INVENTION

In accordance with the invention, dropping of the load, due to accidental failure of current fed to the coil or winding, is prevented by providing a core of permanent magnet material. The energization of each winding, is one direction, results in augmenting the magnetic flux due to the permanent magnet core, and the windings may be reversely energized to neutralize the flux of the magnetic cores. A timer in an energizing circuit interrupts the main energizing current of the windings after a load has been picked up, so that the load is held magnetically by the permanent magnet flux of the cores. However, a small holding current is supplied to each winding in the forward direction. Each core has a pole piece of magnetizable material secured to its outer end and the pole pieces may be pivotally connected to the associated cores.

This and further objects, features and advantages of the invention will become more apparent as the description proceeds by reference to the accompanying drawings illustrative of several preferred embodiments of the invention.

DESCRIPTION OF THE PREFERRED EMBODIMENTS

Figure 1:
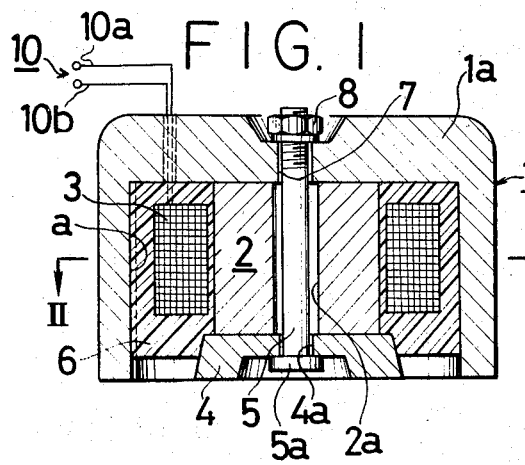
FIG. 1 is an axial section of a first embodiment of the invention, embodying the basic principles of the invention and representing a simplest design comprising a single core and a single winding.
Figure 2:
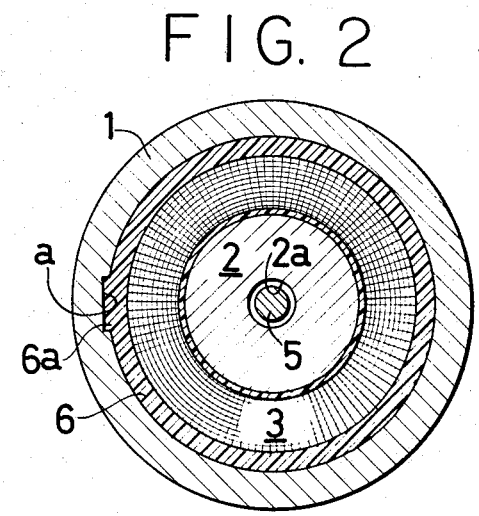
FIG. 2 is a cross-section of the embodiment shown in FIG. 1, taken substantially along a section line II—II'.

Referring now to FIGS. 1 and 2, numeral 1 represents a casing made of a magnetizable metal, preferably cast iron, and shaped into an inverted cup having a bottom wall 1a centrally perforated at 7 for receiving a bolt 5. Although the casing 1 has preferably a round cross-section as shown, it may have a square, hexagonal or other polygonal shape when occasion may require.

Concentrically with the casing 1, a core member 2 is fixedly positioned within the interior space thereof by means of bolt 5 and a fixing nut 8 tightly screwed thereon. For this purpose, the core member 2 is centrally perforated at 2a, so as to provide a bolt hole as shown. According to the main feature of the invention, the core member 2 is made of a permanent magnetic material, such as steel. or more preferably a ferromagnetic material, such as sintered iron oxide alloy. Since various other ferromagnetic materials are known, any one thereof can be selected for the formation of the core member 2.

The bolt 5, having an enlarged head 5a, is made of non-magnetic material such as brass. A preferably dish-shaped inner pole piece 4, made of iron as an example, is kept in pressure contact with the lower surface of core member 2 under upwardly directed pressure exerted from the bottom onto the inner pole piece by the bolt head 5a. For receiving the bolt 5, the pole piece 4 is centrally perforated at 4a as shown. As will become clear as the description proceeds, pole piece 4 forms inner magnetic pole.

A coil winding 3 is arranged around the core member 2 and embedded in a plastic resin mass 6, such as epoxy resin, molded in the ring space formed between the core member and the housing.

As seen from FIG. 2, the housing 1 is formed at its inside wall surface with a vertically elongated recess denoted simply by "a" and, correspondingly thereto, the resin mass 6 is formed on its outer peripheral surface with a vertically elongated positioning ridge 6a, for preventing relative rotation between the housing 1 and the molded resin mass 6 together with coil winding 3.

Leads, generally shown at 10 and consisting of conductor elements 10a and 10b, are led out from the coil winding 3, as most clearly be seen from FIG. 1 and only schematically shown in FIG. 7, for feeding the energizing current from a current source which will be further described in detail by reference to FIG. 7, together with the operation of the unit shown in FIGS. 1 and 2.

Figure 3:
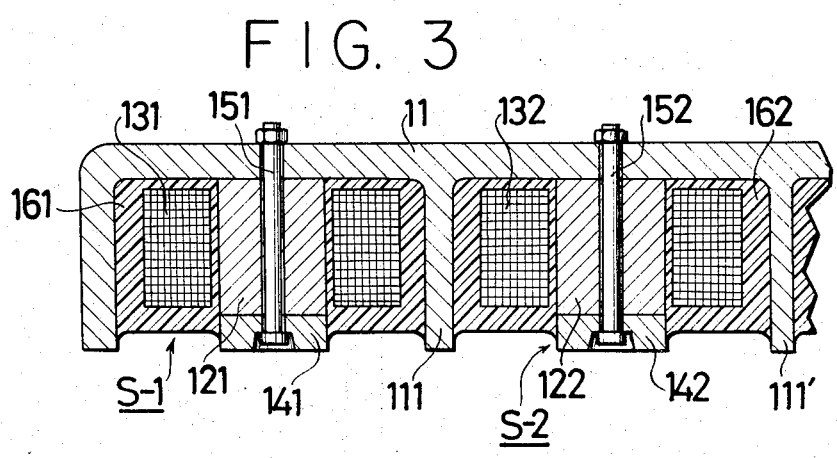
FIG. 3 is a view similar to FIG. 1, showing a second embodiment of the invention which comprises a plurality of electromagnetic units arranged in parallel to each other.

In the second embodiment, shown in FIG. 3, the housing denoted 11, instead of the housing 1 employed in the first embodiment, is formed into generally a square or rectangular configuration in its plan view and formed with a plurality of separating walls 111, 111'. . . , as seen. Although not shown, the housing 11 is formed further with a number of crossing walls positioned at regular intervals, so as to represent generally a lattice work of which only two cellular spaces are representatively shown at S-1 and S-2.

In each of these cellular spaces, a core-coil assembly, such as employed in the first embodiment is fitted. The cores are representatively shown at 121, 122 . . . . Inner pole pieces are shown at 141, 142 .... Fixing bolts are illustrated at 151, 152 ... Coils are shown at 131, 132 .... Molded resin masses are shown at 161, 162 ... . Thus, it will be seen that the common housing 11 provides a single outer pole member common to all the electromagnet units employed in this embodiment.

Figure 7:
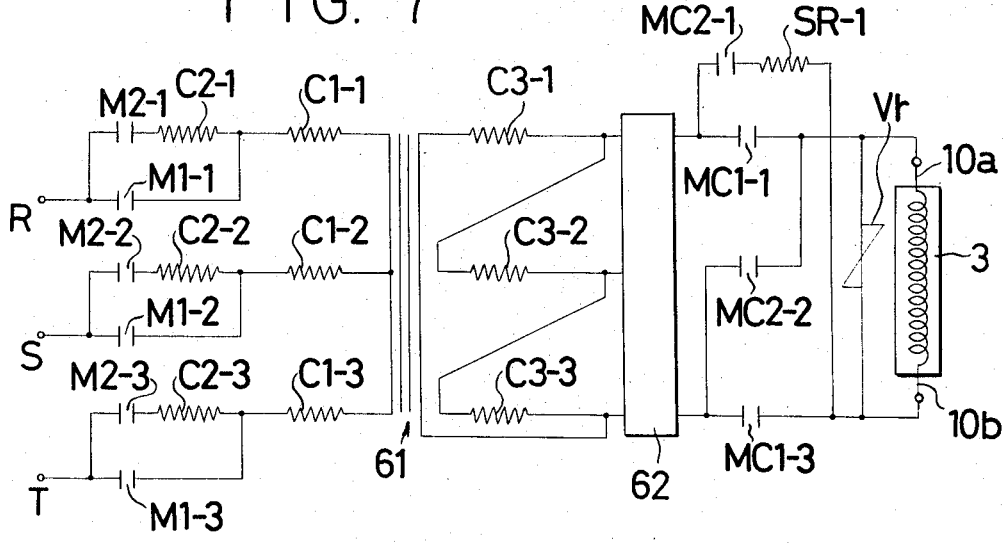
FIG. 7 is an embodiment of the energizing circuit attached to the lifting assembly.

Although not shown, the coil windings 131, 132 ... are fitted with lead-out conductors similar to those shown at 10 in FIG. 1, so as to be fed with energizing current from a current source, as shown in FIG. 7. These coil windings may be connected in series or, alternatively, in parallel to each other, with the current source, although this is not shown on the drawing only for simplicity.

The material used for the permanent magnets, especially ferromagnetic material most preferably used therefor, is rather fragile so that it is highly difficult to prepare and fit a larger size core in a large capacity hoisting magnet assembly embodying the principles of the invention. However, by adopting the lattice work structure as employed in the embodiment of FIG. 3, an increased capacity of the hoisting magnet means as a whole can be easily met as desired.

Next, referring to FIGS. 4 and 5, a third embodiment of the invention will be described in detail hereinbelow.

Figures 4, 5:
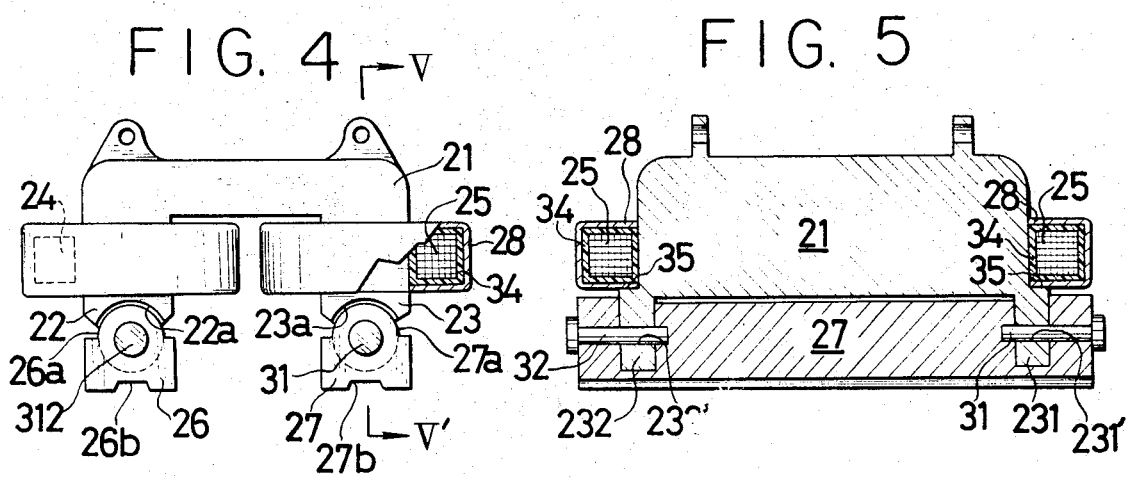
FIG. 4 is an elevational view, partially sectioned, of a third embodiment of the invention, comprising two electromagnetic units.
FIG. 5 is a sectional view of the assembly shown in FIG. 4, taken substantially along a section line V—V'.

In this embodiment, numeral 21 represents a core member made of a ferromagnetic material as before and shaped into a channel configuration in its elevational view shown in FIG. 4, having depending legs 22 and 23. The lowermost end of each of these legs 22 and 23 presents a concavedly curved surface 22a or 23a, respectively.

Coil windings 24 and 25, respectively are wound around these core legs, and each of these windings is encased in a respective cover casing 28 and 29, respectively and in a molded manner as before, as shown representatively at 34.

As representatively seen from FIG. 5, the end of each of the core legs 22 and 23 is formed with a pair of depending projections 231 and 232 and each of the coil-cover assemblies 25-28-34 is fixedly positioned against a shoulder 35. A pair of pivot or fixing pins 31 and 32 are provided and, for this purpose, the projections 231 and 232 are formed with respective bores 231' and 232'.

An auxiliary pole piece 27 is pivotably and suspendedly attached to core leg 23 by means of said positioning pins 31 and 32.

An auxiliary pole piece 26 is pivoted to core leg 22. Corresponding fixing or pivot pins are shown only representatively at 312 for the leg 22.

The upper surface of the auxiliary pole piece 27 is convexedly curved as shown at 27a corresponding to the concavely curved surface 23a at the lowermost end of the depending projection 23. The bottom surface of auxiliary pole piece 27 serves as magnetically attracting end and is formed with an axially elongated groove 27b having a small depth and representing generally a plane surface. However, this surface can take any other modified form, so as to best meet with the coacting surface of the body to be hoisted and transferred.

Figure 6:
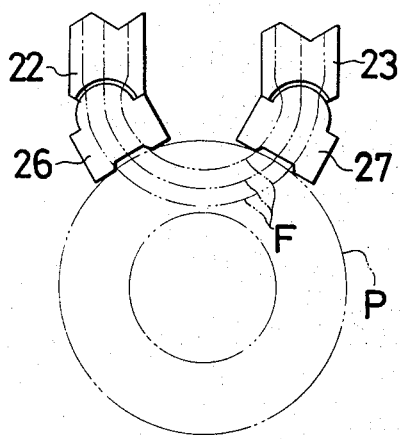
FIG. 6 is an illustrating schematic representation for the demonstration of the working mode of the third embodiment shown in FIGS. 4 and 5.

Since the structure of the hoisting assembly according to the FIGS. 4 and 5 has been designed as shown and described so far, it can be utilized to hoist an elongated and curve-surfaced body or part, as in the case of an elongated pipe. A sample of the hoisting job by use of the third embodiment is illustrated in FIG. 6 in a highly simplified schematic way. As seen, the other auxiliary pole piece 26 is similarly shaped and arranged. The elongated groove 26b corresponds to that shown at 27b in FIG. 4.

In FIG. 6, the body to be hoisted represents a thick and heavy pipe "P." As seen, the provision of the pivotable pole pieces 26 and 27 is highly convenient in the handling of the pipe. In this FIG. 6, chain-dotted lines "F" represents the passage mode of magnetic fluxes through legs 22, 23, pole pieces 26, 27 and the pipe "P." The convenience and high operational magnetic efficiency in the hoisting job should be self-explanatory.

The operation of the hoisting assembly will be described by reference to FIGS. 7 and 8, in combination with FIGS. 1 and 2.

In FIG. 7, "R," "S" and "T" represent three terminals connected to respective three-phase conductors of a commercial power transmission system. Numeral 61 represents a transformer and 62 a rectifier of the conventional design and thus shown as only schematically representive blocks. Numeral 3 represents the energizing coil shown also in FIGS. 1 and 2.

At the primary side of the transformer 61, there are provided resistors C1-1, C1-2 and C1-3 and C2-1, C2-2 and C2-3, and relay contacts M1-1, M1-2 and M1-3 and M2-1, M2-2 and M2-3 which are connected one after another as shown.

Between the transformer 61 and the rectifier 62 and at the secondary side of the transformer, there are inserted resistors C3-1, C3-2 and C3-3 which are connected with each other as shown.

Between the rectifier 62 and the energizing coil 3, there are relay contacts MC1-1, MC1-3, MC2-1 and MC2-2, a series-connected resistor SR-1 and a conventional surge absorber Vr which are connected with each other and between rectifier 62 and coil winding 3 as shown.

Figure 8:
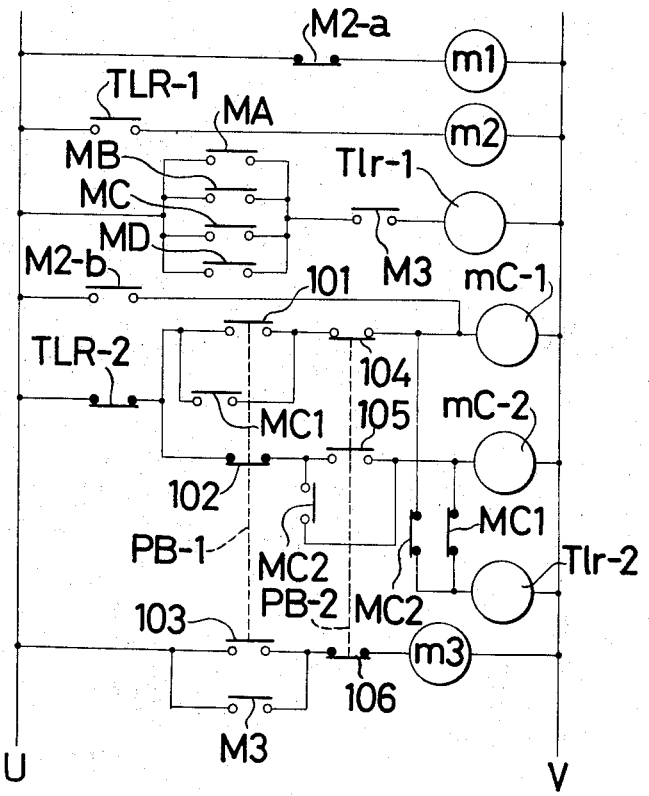
FIG. 8 is an embodiment of the control circuit.

FIG. 8 shows a control circuit wherein conductors "U" and "V" are connected to a d.c.-current source, not shown.

MA and MB represent electromagnetically operated switch contacts which are brought into operation upon initiation of transverse travel, on the girder, of the hoisting unit shown in FIG. 1 to be used when it is fitted on an overhead travel crane. MC and MD represent similar switch contacts controlled by initiation of longitudinal travel of the girder on guide rails, although not shown.

Symbol tlr-1 represents a timer relay coil which, when energized, operates to control the operation of a normally closed contact M2-a and a normally open contact M2-b for a certain predetermined time period, even upon opening of all of or any one of switch contacts MA, MB, MC and MD.

Symbol tlr-2 represents a further timer relay coil which, when energized, opens the main energizing circuit shown in FIG. 7 after lapse of a certain predetermined period upon initiation of the attracting operation of the electromagnetic unit shown in FIGS. 1 and 2.

PB-1 represents a push button type gang switch having switch elements 101, 102 and 103 for initiation of a starting of the electromagnetic load-attracting operation, while PB-2 represents a similar push button type gang switch having switch elements 104, 105 and 106 for initiation of a reversedly directed enrgization, or more specifically, de-energization of the core means for release of the once attracted load.

Symbols m1, m2, m3, mc1 and mc2 represents respective operation-control relay coils inserted in the control circuit as shown in FIG. 8.

Relay coil m1 controls, by energization and de-energization thereof, the position of contacts M1-1, M1-2 and M1-3 shown in FIG. 7.

Relay coil m2 controls, by energization and de-energization thereof, the position of contacts M2-1, M2-2 and M2-3.

Relay coil m3 controls, by energization and de-energization thereof, a normally open contact M3 located as shown in FIG. 8.

Relay coil mc1 controls, by energization and de-energization thereof, contacts MC1-1 and MC1-3 shown in FIG. 7.

Relay coil mc2 controls, by energization and de-energization thereof, contacts MC2-1 and MC2-2.

Resistors C1-1, C1-2 and C1-3 in FIG. 7 are adjusters serving for adjustment of the primary source voltage.

Resistors C2-1, C2-2 and C2-3 in FIG. 7, are current limiting resistors serving for a safety operation, as will be more fully described hereinafter.

Resistors C3-1, C3-2 and C3-3 in FIG. 7 are adjusters serving for adjustment of the secondary source voltage.

Figure 10:
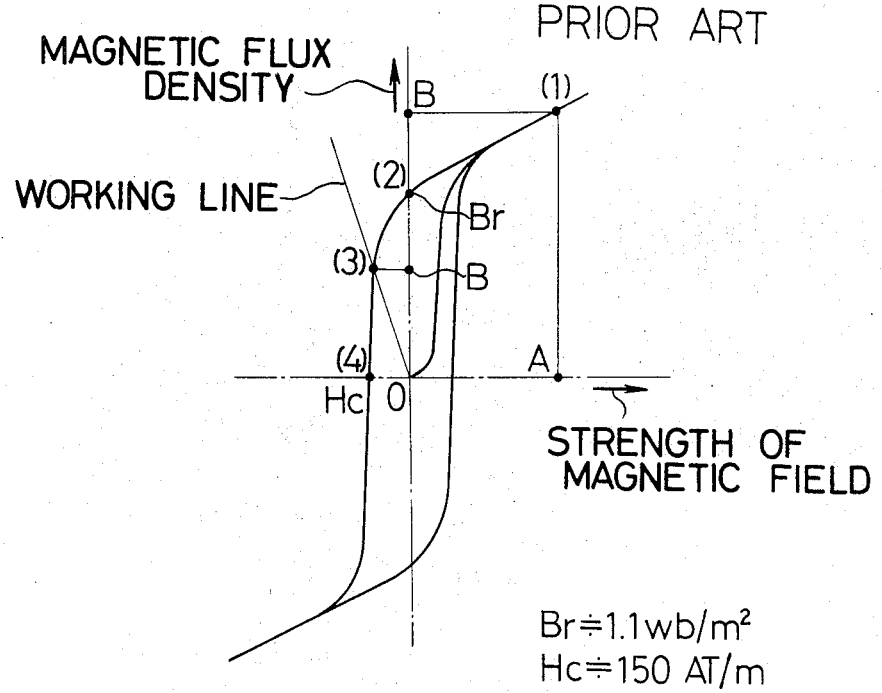

In FIG. 10, a hysteresis curve is shown when the core member is composed of soft steel as conventionally. In this case, the residual hysteresis effect is very small represented by the smaller as hysteresis area and thus the desired effect, as was described in the foregoing, can not be obtained in the practical sense.

Figure 9:
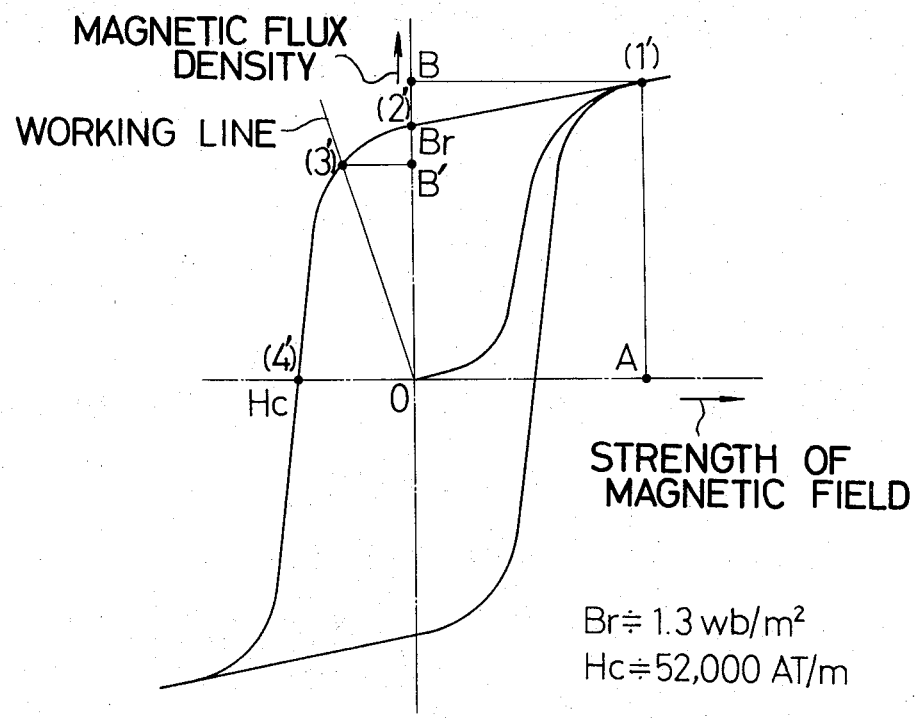
FIGS. 9 and 10 are explanatory and comparative hysteresis curves showing the difference in the operation between the conventional technique and the inventive one.

In comparison therewith, FIG. 9 represents a hysteresis curve when employing a permanent magnetic steel as the material of the core member. As seen, the hysteresis area is substantially broader than the conventional and can be utilized for the purpose of the invention.

This material does not show substantially any magnetic force when the energizing coil is not energized. With application of energizing current to the coils, as was referred to hereinbefore, the working point will shift from (0) to (1') along the initial hysteresis curve and, therefore, the core member is brought into its energized condition. With interruption of the energizing current, the working point will shift from (1') through (2') to (3'), the working line being positioned finally at the last point (3').

This point (3'.) is the working point of the core member acting as a permanent magnet, the flux density B' as measured at this working point corresponding to the attracting force of the permanent magnet. By utilization of this, the magnetic attraction can be maintained safely even upon interruption of the energizing current.

When it is desired to release the attracted load, a de-energizing current is applied to the energizing coil or coils. Then, the working point will shift along the hysteresis curve in the reverse order from (3') to (4'). When the flux density becomes nil, the magnetic attraction will be released completely, so as to perform the load-releasing operations, and the working point will shift further to (0) which is the origin of the diagram.

As a preferable example, the casing is made of soft steel the inner pole piece 4 again from soft steel. The core member is made from permanent magnet steel. Supporting bolt 5 may be made from stainless steel.

The operation is as follows:

When push button PB-1 is depressed, its contacts 101 and 103 are closed, while its contact 102 is opened, whereby relay coils mc-1 and tlr-2 being energized. At the same time, auxiliary relay m3 is also energized. Under these conditions, relay coil m1 is kept at its energized state.

The timer relay contact TLR-2 will initiate its time-limiting operation instantly upon energization of relay tlr-2 and open after lapse of a short time period, say 2 seconds. At this period, when timer relay contact TLR-2 is interrupted, relay mc-1 is de-energized, so as to bring relay contacts MC1-1 and MC1-3 shown in FIG. 7 into open position. By hitherto continued current conduction through coil winding 3, the core member 2 has been energized and will continue its energized state even upon de-energization of winding 3 which is now dead.

Until the coil winding 3 is reversely energized, as will be more fully described hereinafter, the core member can keep its energized state and thus a load-carrying operation can be maintained with safety.

Should the hoist carry a heavy load substantially equal to the maximum allowable capacity thereof, the load could drop, even upon application of a smallest outside accidental impact thereonto. Therefore, it is highly recommendable to provide a certain safety measure to prevent this kind of possible accident.

When the crane moves in any of the traverse directions or in any of the longitudinal directions, either or both electromagnetically operated contacts MA and MB is/are closed, so as to energize relay coil tlr-1 for closing its timer contact TLR-1. Thus, relay coil m2 is energized. Therefore, its normally closed contact M2-a is opened, while its normally open contact M2-b is closed. These relay contacts M2-a and M2-b are arranged to control energization and de-energization of relay coils m1 and mc1, respectively. With the thus brought-about de-energization of relay coil m1 and with the thus brought-about energization of relay coil m2, relay-operated contacts M1-1, M1-2 and M1-3 shown in FIG. 7 are interrupted, while relay-operated contacts M2-1, M2-2 and M2-3, and MC1-1 and MC1-3 are closed. Therefore, a weak safety current will flow through the coil winding 3.

This safety-operational condition will be continued, so far as either or both contacts MA or/and MB is/are kept in their closed position.

When either or both of these contacts MA or/and MB is/are interrupted, the timer relay contact TLR-1 will initiate its time-limiting job and upon lapse of a predetermined time period, this contact TLR-1 will be opened, so as to de-energize the relay m2. In succession thereto, relay mc1 is de-energized and, therefore, the safety operation with the weak current is ceased. Naturally, even under these conditions, the core element 2 is maintained in its energized or magnetized state.

When it is desired to de-energize the core element 2 for releasing the attracted load from the hoist, push button PB2 serving for this releasing operation is depressed, whereby relay coil mc2 and time relay tlr-2 are energized, while, at the same time, relay coil m3 is de-energized. With energization of relay coil mc2, relay contacts MC2-1 and MC2-2 are closed, and coil winding 3 is supplied with a reversely flowing current so that core member 2 is de-energized to release its hitherto attracted load.

With energization of relay contact tlr-2, TLR-2 will be opened, so as to de-energize relay coil mc2, whereby relay contacts MC2-1 and MC2-2 are opened. Therefore, the main circuit components shown in FIG. 7 will recover their initial position ready for operation.

Although the operation has been described in connection with the basic electromagnetic unit shown in FIGS. 1 and 2, it would be clear from the foregoing that the second and third embodiments can operate in the similar way.

What is claimed is:

1. An electromagnetic hoisting mechanism comprising, in combination, at least one core of permanent magnet material; a respective magnetizing winding embracing each core; a casing having wall means at least partially enclosing each winding; a current supply circuit connected to each winding and arranged for connection to a source of electric current; switch means in said supply circuit selectively operable to energize said windings in a forward direction to augment the permanent magnet flux of the associated cores or in a reverse direction to neturalize the permanent magnet flux of the associated cores; and timer means in said supply circuit activated, responsive to energization of said windings in said forward direction, to pick up a load by magnetic attraction, to deenergize said windings after a predetermined short time interval so that the load is then held magnetically solely by the permanent magnet flux of said cores.

2. An electromagnetic hoising mechanism, as claimed in claim 1, in which said supply circuit includes means operable, responsive to horizontal travel of said hoisting mechanism after such deenergization of said windings, to supply a reduced energizing current to said windings in said forward direction to augment the permanent magnet flux of the associated cores to prevent accidental dislodgment of a load, carried by said hoisting mechanism, by striking an obstruction.

3. An electromagnetic hoisting mechanism, as claimed in claim 1, in which there are two cores forming the respective legs of a permanent magnet having the shape of a relatively elongated channel and having a yoke forming the base of the channel; and a respective relatively elongated pole piece of permanent magnet material pivotally secured to the outer end of each leg for swinging about an axis extending parallel to the length of the associated leg; each pole piece having a groove extending centrally of its outer face and having a transversely convex elongated inner face concentric with said axis and closely adjacent and concentric with a transversely concave groove extending longitudinally of the outer end of the associated channel leg; whereby said hoisting mechanism is magnetically cooperable with a load having a curved external surface by orienting said pole pieces parallel to the axis of curvature of the load surface with the pole pieces engaging circumferentially spaced areas of the external surface of the load.

* * * * *